United States Patent [19]
Gergovich

[11] 3,782,030
[45] Jan. 1, 1974

[54] SINGING SOUND PRODUCER FOR BICYCLES

[76] Inventor: Frank A. Gergovich, 1114 Eighth St., La Salle, Ill. 61301

[22] Filed: Dec. 4, 1972

[21] Appl. No.: 311,462

[52] U.S. Cl............................................. 46/175 R
[51] Int. Cl.............................................. A63h 5/00
[58] Field of Search..................... 46/175 R, 88, 87; 273/53 B, 53 E, 65 B

[56] References Cited
UNITED STATES PATENTS
2,748,532  6/1956  Gergovich et al................ 46/175 R
2,719,385  10/1955  Wilson............................. 46/175 R
1,283,095  10/1918  Cummiskey...................... 46/88

Primary Examiner—Louis G. Mancene
Assistant Examiner—J. Q. Lever
Attorney—Charles W. Rummler et al.

[57] ABSTRACT

A harmonic sound producer comprising a hollow body with a B—B loaded resilient nipple adapted to be repeatedly engaged by a continuous series of rapidly moving elastic string-like elements, such as the wire spokes of a bicycle wheel, so as to produce singing sounds by the wire spokes of the wheel as vibrating string-like elements that are resonant and tuned to various frequencies by changing the tension on the spokes.

4 Claims, 6 Drawing Figures

PATENTED JAN 1 1974
3,782,030
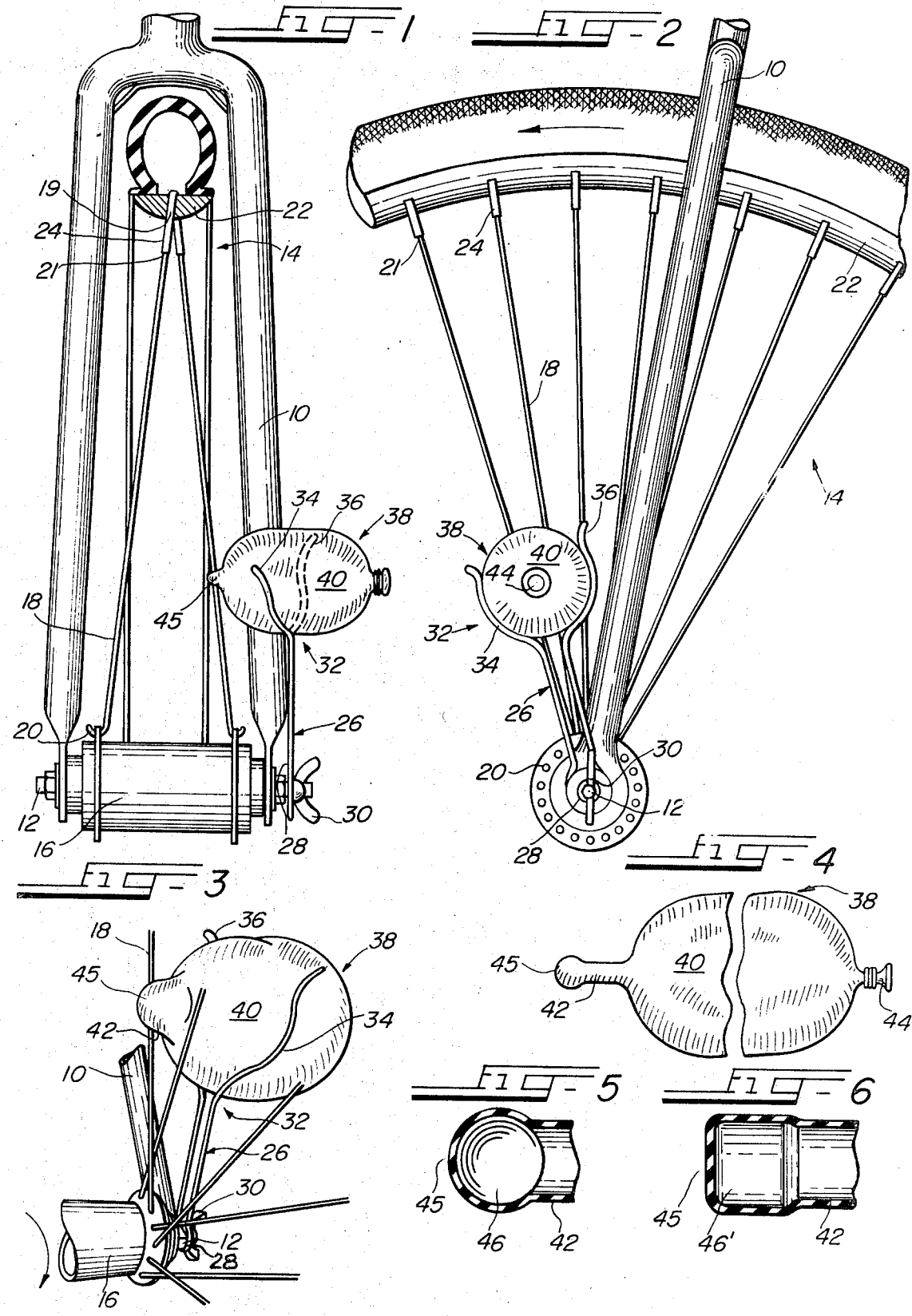

SINGING SOUND PRODUCER FOR BICYCLES

BACKGROUND OF THE INVENTION

It has been common practice in the past for the bicycle riding youth of our nation to clamp cards or flat sticks to the yokes of their bicycles adapted to be repeatedly engaged by the continuous rapidly moving spokes of an adjacent bicycle wheel to provide a sound which will simulate the exhaust sound of a rapidly operating internal combustion engine.

Improvements have been made on this primitive do-it-yourself bicycle accessory device and one such improvement is disclosed by my U.S. Pat. No. 2,748,532, which shows a hollow resonating body having a resilient elastic portion arranged for the engagement by the rapidly moving bicycle wheel spokes and capable of producing sounds like that of a motor wheel so engaged. Such devices have a renewable elastic contact-actuated element that may be readily replaced when worn and in one form comprises an inflated balloon and means for mounting the same in the proximity with spokes of a revolving wheel for continuous, rapidly repeated engagement thereby. Thus only a portion of the balloon body is subject to contact engagement with the spokes of the wheel as the same is revolved in passing by and the balloon is capable of having its pressure varied from within by degrees of inflation to give varying sounds produced therefrom.

In today's dynamic national marketplace, consumer demand varies with the time and circumstance and such are the whims of the bicycle riding youth of the nation that something new and different is wanted to satisfy the changing fads and desires that permeate our society and generate new business activity for our economy.

There is thus a need for an improved form of low cost device for producing sounds from a bicycle not only simulating the exhaust sound of an operating motor, but also for simultaneously producing sounds of various harmonic frequencies having a pleasing tonal quality that both attracts attention and adds distinction to the bicycling user. Such a novel device should have an improved resilient contact element which is engaged by the rapidly moving individual contacting spokes of the revolving bicycle wheel, and which spokes are installed therein with varying degrees of tension to produce sounds of various harmonic frequencies. Such harmonic frequencies are combined in a resonator for amplifying and mixing therein for the production of "singing" tones which are pleasing to the ear rather than the hollow put-put motor sound of the prior art devices. Also, such an improved device should be readily detachable from the bicycle for renewal or replacement of the sound-producing element.

SUMMARY OF THE INVENTION

The gist of this invention lies in an improvement over the prior art attained by molding or otherwise embedding a B—B shot or similar body mass of hard material into the tip of the nipple of an inflated balloon or soft elastic body which is mounted on a bicycle frame so as to be struck repeatedly by the elastic string-like spokes of a rotating bicycle wheel, which are installed in the wheel with varying degrees of tension according to the harmonic content of the "singing" sound desired by the bicycle rider.

BRIEF DESCRIPTION OF THE DRAWINGS

FIG. 1 shows a fragmented partially sectioned front view of a bicycle with the harmonic sound producer installed on the fork for the bicycle wheels;

FIG. 2 shows a fragmented side view of the subject of FIG. 1;

FIG. 3 shows a fragmented perspective view of the harmonic sound producer installed in a bracket mounted to the axle of the bicycle wheel;

FIG. 4 shows a side view of a balloon form of sound producer with a nipple for resonant amplification of the sound production when engaged by the moving spokes of the revolving bicycle wheel;

FIG. 5 shows a fragmented cross-sectional view of the nipple of the balloon of FIG. 4 with a hard ball shape therein; and FIG. 6 shows a modified form of weighted nipple for the resonator body.

DESCRIPTION OF THE PREFERRED EMBODIMENT

Reference is made to FIGS. 1 and 2 showing the yoke or fork 10 of a conventional bicycle frame having a fixed axle 12 mounted at opposed ends in the arms of the yoke 10 and a wheel 14 having a hub 16 rotatably mounted to the axle 12 between the arms of yoke 10. Wire spokes 18 of the wheel have heads 20 fastened to the hub 16 and radiate to threaded spoke ends 21 at the rim 22 of the wheel 14 for attachment thereto by threaded button-headed sleeves 24 which project outwardly along the radius of the wheel 14, through bores 19 in the rim 22, and engage the threaded ends 21 of the spokes 18. A bracket 26 having an eye 28 mounts over the end of axle 12 against the yoke 10 extending upwardly and forwardly therefrom in a direction proximate to the spokes 18 of the wheels 14. A wing-nut 30 mounts to the end of the axle 12 outside of the eye 28 of the bracket 26 for the securing of the bracket 26 to the end of axle 12. The bracket 26 comprises a wishbone portion 32 having lyrate open arms 34 and 36 extending outwardly from the eye 28, as shown in FIG. 3, and the arms 34 and 36 open in a plane adjacent and parallel with the plane of rotation of spokes 18.

Resonator 38 comprises a hollow body 40 having opposed ends, as shown in FIG. 4, and a nipple 42 having a tip 45 extends from one end of the body. In the form shown, the body 40 is an inflatable bag, such as an elastic balloon, and a filling tube 44 extends from the opposite end thereof. In one version, a solid ball 46 is internally molded into the nipple 42 to form the tip 45, as shown in FIG. 5. The shape that the ball 46 gives to the tip 45 is determinative of the harmonic content of the sound generated in repetitive contact with the spokes 18 of the rotating wheel 14. A solid cube 46' embedded in tip 45, as shown in FIG. 6, would "sing" differently than the ball 46.

In the installation of the balloon 40 in the bracket 26 which is mounted to the axle 12, the body of the balloon is first inflated through filler tube 44 and is then mounted between the lyrate arms 34–36 of the bracket portion 32 with the nipple tip 45, containing the solid ball 46, projecting into the path of the spokes 18 as shown in FIG. 3. The body 40 of the balloon 38 is squeezed between the arms 34 and 36 of the bracket 26 with the nipple tip 45 projecting toward and about onequarter inch into the plane of rotation of the spokes 18, as shown in FIG. 1.

In the form of the invention shown in FIG. 4, the body 40 of the balloon 38 comprises a conventional resonance box for increasing sonority and the power of beauty of tone by sympathetic vibration of the sound waves contained therein. Inflating the balloon 38 to change the pressure of the gas within the balloon body 40 functions to change the tone or character of the sound produced by the resonating body 40 when the tip 45 of the nipple 42 is engaged by the moving spokes 18. The sound generated by the tip 45 of the nipple 42 as it plucks the spokes 18 can also be made high or low pitch, sharp or muffled, as the rider may desire, by changing the tension on individual spokes 18 by tightening of the button-headed sleeves 24 on the threaded ends 21 thereof. Individual spokes 18 act as vibrating springs with line density when pulled aside by momentary contact with the tip 45 of the nipple 42 and then let go by contact with the rotating wheel 14. With the spokes 18 of finite length and fastened at the head end 20 and the rim end 21, as they are in a bicycle wheel 14, standing waves form in the length thereof at certain harmonic frequencies. Each harmonic frequency corresponds to a mode of motion which is characterized by the presence of certain points where no motion takes place, called nodal points, and certain other intermediate points where motion is a maximum. Thus, only certain tonal frequencies are possible from each spoke 18 depending upon the tension to which it has been drawn to get the overall tonal mix contributed from all of the spokes 18 of the wheel 14 combined.

In the plucking of the spokes 18 by the tip 45 of the nipple 42, excitation of the spokes 18 in harmonic vibration produces the sonic frequencies desired when the nipple 42 of the balloon 38 is bent and suddenly let go in the direction of rotation of the wheel 14, as shown in FIG. 3. The plucking of the spoke 18 appears as a pulling aside which is suddenly let go by a snapping action of the nipple 42 as it returns to its normal axial position relative to the balloon body 40.

While the balloon 38 of FIGS. 1, 2 and 3 is shown with a wishbone 32, it will be understood that the mounting bracket 26 may have any suitable means for securing the body 40 of the balloon 38 to the yoke 10 in a position generally at right angles with the plane of the spokes 18 of the rotating wheel 14.

Although only one embodiment of this invention is herein shown and described, it will be understood that details of the arrangement and construction shown may be altered without departing from the spirit of the invention as defined by the following claims.

I claim:

1. In a singing sound producer for attachment to a bicycle having a frame with an axis fixed therein, a wheel mounted thereon having a hub and a rim for relative rotation about the axis, a plurality of individually tensionable wire spokes angularly spaced about said axis and radially connecting said hub to said rim, a hollow body having a flexurally elastic nipple-like portion of reduced size projecting therefrom, a mounting means on said frame for holding said body adjacent said rotary wheel with the nipple-like portion extending toward said rotary wheel for engagement with and plucking of successive ones of said tensionable wire spokes, and means for causing relative movement of said frame and said rotary wheel about said fixed axis, the improvement in said nipple-like portion comprising
 a mass of hard material embedded in the tip end of said nipple-like portion.

2. A singing sound producer as set forth in claim 1 wherein the hollow body comprises an inflatable bag.

3. A singing sound producer as defined by claim 1 wherein the hollow body comprises an elastic balloon and the end of the nipple-like portion is stretched to receive and retain the said mass of material.

4. A singing sound producer as defined by claim 1 wherein the mounting means comprises a bracket having a pair of lyre-like arms between which the elastic balloon body is disposed and frictionally held when inflated.

* * * * *